United States Patent
Arahira

(10) Patent No.: US 8,433,200 B2
(45) Date of Patent: Apr. 30, 2013

(54) METHOD AND SYSTEM FOR QUANTUM KEY DELIVERY UTILIZING A CONVERSION EFFICIENCY OF DFG

(75) Inventor: Shin Arahira, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 93 days.

(21) Appl. No.: 13/210,414

(22) Filed: Aug. 16, 2011

(65) Prior Publication Data

US 2012/0051755 A1    Mar. 1, 2012

(30) Foreign Application Priority Data

Aug. 27, 2010  (JP) ................... 2010-191078

(51) Int. Cl.
*H04B 10/12*  (2006.01)
*H04B 10/06*  (2006.01)

(52) U.S. Cl.
USPC ........... 398/142; 398/162; 398/196; 398/197; 398/212; 398/213; 380/256

(58) Field of Classification Search .................. 398/140, 398/141, 142, 162, 163, 182, 195, 196, 197, 398/200, 212, 213
See application file for complete search history.

(56) References Cited

U.S. PATENT DOCUMENTS

| | | | |
|---|---|---|---|
| 2009/0180616 A1* | 7/2009 | Brodsky et al. | 380/256 |
| 2010/0079833 A1* | 4/2010 | Langford et al. | 359/107 |
| 2010/0226659 A1* | 9/2010 | Nishioka et al. | 398/154 |
| 2011/0211244 A1* | 9/2011 | Peters et al. | 359/227 |

OTHER PUBLICATIONS

H.C. Lim et al., "Stable source of high quality telecom-band polarization-entangled photon-pairs based on a single, pulse-pumped, short PPLN waveguide", Optics Express, vol. 16, No. 17, pp. 12460-12468 (2008).

J.F. Dynes et al., "Efficient entanglement distribution over 200 kilometers", Optics Express, vol. 17, No. 14, pp. 11440-11449 (2009).

Shin Arahira et al., "Parametric down conversion through cascaded $\chi(2)$ process in a PPLN ridge waveguide", Material on 21st Research Society on Quantum Information Technology, Time-Limited Research Expert Committee on Quantum Information, The Institute of Electronics, Information and Communication Engineers of Japan, pp. 184-187 (2009).

Kyo Inoue, "Quantum Engineering for Engineers", published by Morikita Publishing Co., Ltd., Toyko, Japan, 1st Ed., 1st issue, pp. 154-156, Feb. 6, 2008.

* cited by examiner

*Primary Examiner* — Kenneth N Vanderpuye
*Assistant Examiner* — Daniel Dobson
(74) *Attorney, Agent, or Firm* — Rabin & Berdo, P.C.

(57) ABSTRACT

A quantum key delivery system includes an optical circulator, an optical low-pass filter, optical splitters, and first and second optical couplers arranged for outputting various wavelength components including correlated-photon pair wavelength components outputted from an optical loop path. The first and second optical couplers output light beams, which are sent over first and second quantum channels to first and second recipients, respectively. Other optical splitters are adapted to output light rays, from which first and second control signals are produced. From auxiliary idler light components transmitted over the first and second quantum channels, clock signals are extracted. The system thus extracts a clock signal for detecting arrival of photons, and stably operates with an expected value of the number of generated correlated photon pairs maintained at a substantially constant value.

20 Claims, 6 Drawing Sheets

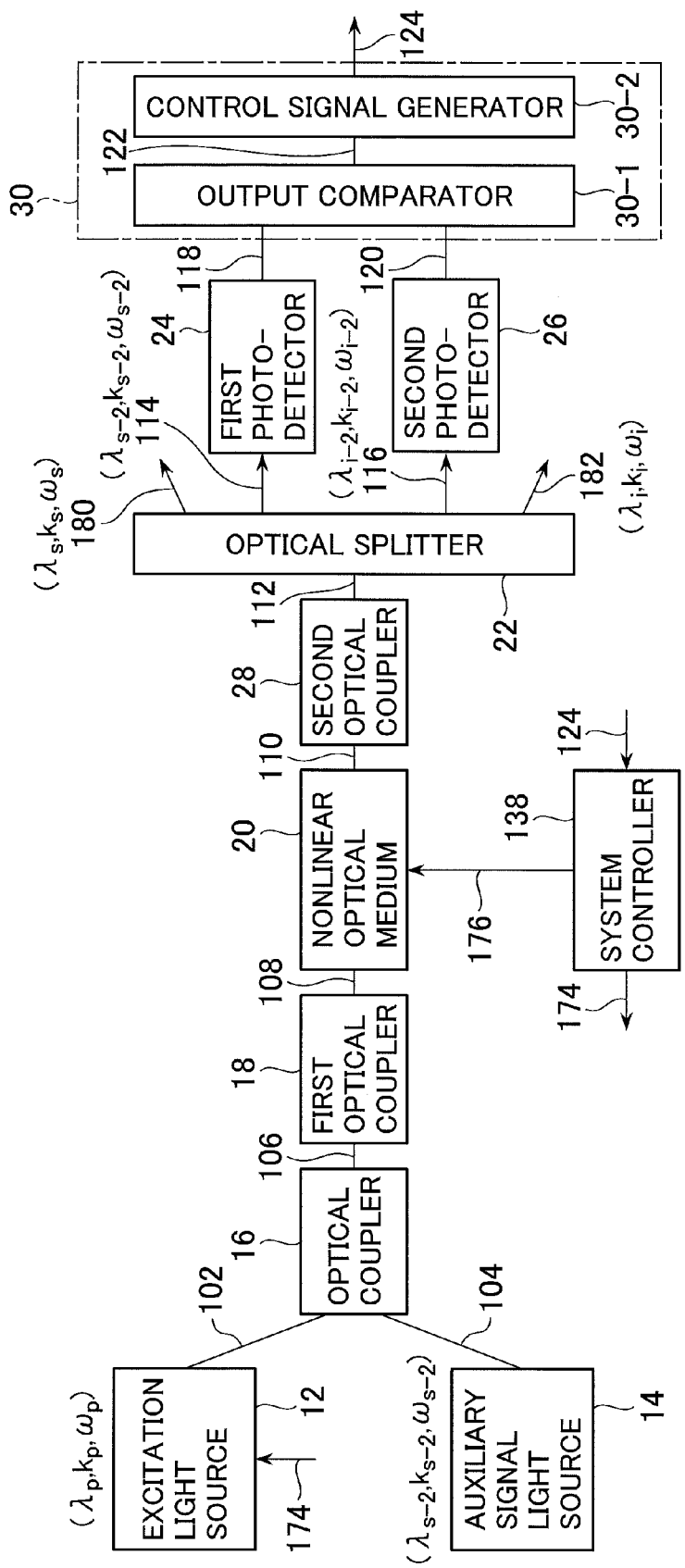

METHOD AND SYSTEM FOR QUANTUM KEY DELIVERY UTILIZING A CONVERSION EFFICIENCY OF DFG

BACKGROUND OF THE INVENTION

1. Field of the Invention

The present invention relates to a method and a system for quantum key delivery, and more particularly to such a system and a method for use in quantum cryptographic telecommunications system.

2. Description of the Background Art

It is anticipated that quantum cryptographic communication systems will achieve ultimate secrete communications and be applied to future, high-security information communication systems.

In order to realize a quantum cryptographic telecommunications system, either a single photon source for generating a single photon per pulse or a photon entanglement source for generating a pair of quantum entangled photons per pulse is necessary. From a viewpoint of distant telecommunications, telecommunications systems using quantum entangled photon pairs are promising in the future.

One of the solutions used heretofore as means for generating pairs of quantum entangled photons is to use spontaneous parametric fluorescent light in a second- or third-order nonlinear optical medium. More specifically, when a second- or third-order nonlinear optical medium receives exciting photons having a wavelength of $\lambda_p$, a wave number of $k_p$, and an optical angular frequency of $\omega_p$, it produces a signal photon having a wavelength of $\lambda_s$, a wave number of $k_s$ and an optical angular frequency of $\omega_s$ as well as an idler photon having a wavelength of $\lambda_i$, a wave number of $k_i$ and an optical angular frequency of $\omega_i$. This is a process in which spontaneous parametric fluorescence occurs. At this time, a signal photon and an idler photon are simultaneously produced necessarily in pair.

If a second-order nonlinear optical medium is used, relationships given by the following Expressions (1) and (2) are established between the wave numbers and optical angular frequencies of the exciting photon, signal photon and idler photon to correspond to the law of conservation of momentum and the law of conservation of energy, respectively.

$$k_p = k_s + k_i + K \quad (1)$$

$$\omega_p = \omega_s + \omega_i \quad (2)$$

When a second-order nonlinear optical medium is used, spontaneous parametric fluorescence is also known as spontaneous parametric downconversion (SPDC).

If a third-order nonlinear optical medium is used, spontaneous parametric fluorescence is also known as spontaneous four-wave mixing (SFWM). The wave number and optical angular frequency of each photon satisfy relationships given by the following Expressions (3) and (4).

$$2k_p = k_s + k_i + K \quad (3)$$

$$2\omega_p = \omega_s + \omega_i \quad (4)$$

where K contained in Expressions (1) and (3) is a parameter corresponding to the period of a periodically modulated structure of nonlinear optical coefficients. Today, such periodically modulated structures of nonlinear optical coefficients are frequently used in, e.g. cases where a crystal of $LiNbO_3$, described later, is adopted as a nonlinear optical medium with the purpose of enhancing the nonlinear optical effect by pseudo phase matching.

Besides the correlative relationships of wave number and optical angular frequency described above, there is a correlative relationship in polarization between a signal photon and an idler photon. Pairs of signal and idler photons produced in spontaneous parametric fluorescence and correlated with each other in that way, i.e. quantum entangled photon pairs, are generally termed quantum correlated photon pairs or simply correlated photon pairs, which may be hereinafter referred to.

Apparatus capable of implementing a method of making use of such correlated photon pairs to obtain quantum entangled photon pairs is a quantum correlated-photon pair generator. A quantum key delivery system for accomplishing a quantum encryptic telecom system that realizes communications over long distances such as 100 km to 200 km using a quantum correlated-photon pair generator has been heretofore reported by H. C. Lim, et al., "Stable source of high quality telecom-band polarization-entangled photon-pairs based on a single, pulse-pumped, short PPLN waveguide", OPTICS EXPRESS, Vol. 16, No. 17, pp. 12460-12468 (2008), and J. F. Dynes, et al., "Efficient entanglement distribution over 200 kilometers", OPTICS EXPRESS, Vol. 17, No. 14, pp. 11440-11449 (2009).

However, there still exist many problems in order to accomplish a quantum key delivery system permitting long distance communications over tens of km or more and having practical stability.

Firstly, practical devices or system for attaining a practical quantumkey delivery system needs to continue to stably operate over a long term while at least maintaining predetermined values. For example, a performance required for a light source applicable in currently predominant optical communication systems is the capability of stably maintaining the optical output value over a long term.

However, practical devices or system, when continuously used under the same conditions, vary in characteristics with age. Therefore, practical devices or system is required to be equipped with mechanisms which can detect whether or not the practical devices or system is out of the prescribed operational state and which permit a deviation thus detected to be fed back so as to restore the intended prescribed state thereof.

In the existing optical communication systems, semiconductor lasers or the like are used as its light source, and are attempted in stabilizing the output value thereof by the following measures. Namely, part of the output light from a light source, e.g. laser, is branched off to monitor its intensity so that, if the intensity is above or below a prescribed value, the driving current is increased or reduced accordingly to thereby stabilize the output light from the light source. Alternatively, the resonator has its one end surface serving as taking out an output light and its other end surface serving as monitoring the intensity of the output light so that, if the intensity is above or below a prescribed value, the driving current can be increased or reduced accordingly to thereby stabilize the output light of the semiconductor laser.

In view of the foregoing, it is desired that, in a practical quantum correlated-photon pair generator capable of being used in actual information communication systems, at least the number of correlated photon pairs contained per pulse be stabilized at a given average, or expected value over a long period of time, and that some solution or other be established for ascertaining that the number remains stabilized.

On the other hand, quantum key delivery systems are operable on the assumption that one photon is used per pulse, i.e. a pair of photons is used per pulse. If plural photon pairs are present per pulse, it would be possible to take out some of the pairs for eavesdropping. That would greatly impair the secrecy provided by quantum encryption.

Accordingly, it is impossible to apply the solution used in the aforementioned existing light sources for optical communications to quantum correlated-photon pair generators in order to stabilize the light source output because the branching-off and detection of some of the photons would inherently annihilate photons conveying signals, and because the measurement does affect or destroy the quantum state, making it impossible to transmit correct information to the recipient.

In particular, there has been needed a solution for assuring that a quantum correlated-photon pair generator stably operates while maintaining its preset state, e.g. continuously stably generates a single pair of correlated photons. However, there is yet no report on how to implement such a solution.

Now, secondly, in a telecommunications system having a transmission distance longer than tens of kilometers, the temperature dependency or the like of the refractive index of the free space or optical fiber forming a transmission path causes signals to arrive at random moments. Therefore, in order to accurately receive signals in a long-distance telecom system, a clock extraction function for extracting a clock signal from the incoming signals is indispensable. That is also the case with quantum information communication systems.

Thus, when implementing a quantum key delivery system, in order to accomplish a long-distance key delivery system stably operating over a long term, it is desired to accomplish the function of monitoring whether or not an expected value of the number of correlated photon pairs is maintained substantially constant over a long period of time and a clock extraction function of extracting a clock signal for detecting the arrival of photons.

SUMMARY OF THE INVENTION

It is therefore an object of the present invention to provide a quantum key delivery system, particularly a long-distance key delivery system, which stably operates over an extensive term. It is another object of the invention to provide a method in such a quantum key delivery system.

The applicant has noticed that, if there exists a physical amount which is produced in a process independent of the process of generating correlated photon pairs and whose expected value correlates with an expected value of the probability at which correlated photon pairs are generated, then the measuring, or monitoring, of such a physical amount allows the expected value of the probability in generating the correlated photon pairs to be known without affecting the process where the correlated photon pairs are generated. In other words, if a physical amount is used which has its expected value correlated with the expected value of a probability at which correlated photon pairs are generated, then the expected value can be indirectly detected although the quantum state of the correlated photon pair itself cannot be measured. The inventor has thus noticed that, if feedback control is provided based on the indirectly expected value of the physical amount, the function of continuously generating a stabilized number of correlated photons substantially equal to the expected value can be accomplished.

Through earnest research, the inventor has found that there is a proportional relation between the expected value of a probability at which correlated photon pairs are generated and the conversion efficiency of a differential-frequency generation (DFG), i.e. the ratio in intensity of an output idler light to an output signal light. That is, the conversion efficiency of a DFG can be used as a physical amount having its expected value correlated with the expected value of a probability at which correlated photon pairs are generated.

Furthermore, the inventor has confirmed that, from an auxiliary idler light component, a clock signal can be extracted to be utilized in accurately receiving incoming signals.

In accordance with the present invention, a quantum key delivery system indirectly monitors how quantum correlated photon pairs are generated, and uses the results of the monitoring to generate pairs of quantum correlated photons such that an expected value of pairs of quantum correlated photons generated can be controllably maintained substantially constant over a long term. The system includes a clock extraction function for detecting arrival of photons.

In a quantum key delivery method in accordance with the present invention, an expected value of the number of generated correlated photon pairs is indirectly monitored, and the result of the monitoring is used to control the state such as to keep substantially constant over a long term the expected value of the number of generated quantum correlated photon pairs controlling the process where correlated photon pairs are generated, while providing the function of extracting a clock signal for detecting the arrival of photons. Also provided is a quantum key delivery system for accomplishing this method.

According to the present invention, a quantum key delivery method comprises: the step of preparing a nonlinear optical medium responsive to excitation light entered to produce pairs of quantum correlated photons based on spontaneous parametric fluorescence, each pair including a signal photon and an idler photon, and responsive to auxiliary signal light entered to produce auxiliary idler light based on a stimulated parametric conversion process; a first step of entering the excitation light and the auxiliary signal light simultaneously into the nonlinear optical medium; a second step of separating output light from the nonlinear optical medium into a signal light component, an idler light component and an auxiliary idler light component to direct and output the components to respective branching optical paths; a third step of, when the signal light component and the auxiliary idler light component are entered, producing a first control signal for adjusting at least one of values of intensity and/or wavelength of the excitation light, and temperature of the nonlinear optical medium such that a ratio in intensity of the auxiliary idler light component to the auxiliary signal light component becomes substantially equal to a predetermined value, and producing a first electrical auxiliary idler signal converted from the auxiliary idler light component; a fourth step of, when the idler light component and the auxiliary idler light component are entered, producing a second control signal for adjusting at least one of the values of the intensity and/or wavelength of the excitation light, and the temperature of the nonlinear optical medium such that the ratio becomes substantially equal to the predetermined value, and producing a second electrical auxiliary idler signal converted from the auxiliary idler light component; a fifth step of using at least one of the first and second control signals to adjust the at least one value to thereby maintain the ratio; and a sixth step of extracting clock signals from the first and second electrical auxiliary idler signals, and converting, in synchronism with the clock signals, the signal light component and the idler light component to a corresponding electrical reception signal and a corresponding electrical idler signal, respectively.

Further in accordance with the present invention, a system for quantum key delivery comprises: a nonlinear optical medium responsive to excitation light entered to produce pairs of quantum correlated photons based on spontaneous parametric fluorescence, each pair including a signal photon and an idler photon, and responsive to auxiliary signal light entered to produce auxiliary idler light based on a stimulated parametric conversion process; an excitation light source for generating the excitation light; an auxiliary signal light source for generating the auxiliary signal light; a first optical coupler for combining the excitation light with the auxiliary signal light to output a resultant combined light; an optical loop path including a polarization separator/combiner having first, second and third input-output ports, and a 90-degree polarization plane rotator, said optical loop path being formed by connecting the second and third input-output ports via said nonlinear optical medium and said 90-degree polarization plane rotator; a first optical splitter for separating output light outputted from said nonlinear optical medium into a signal light component, an auxiliary signal light component, an idler light component and an auxiliary idler light component to output the components; a second optical splitter for dividing the auxiliary idler light component into two components; a second optical coupler for combining one of the two components with the signal light component; a third optical coupler for combining another of the two components with the idler light component; a third optical splitter for receiving a first quantum channel transfer signal including the auxiliary idler light component and the signal light component exiting from said second optical coupler and propagated over a first quantum channel, and separating again the received first quantum channel transfer signal into the signal light component and the auxiliary idler light component to output the light components; a fourth optical splitter for receiving a second quantum channel transfer signal including of the auxiliary idler light component and the idler light component exiting from said third optical coupler and propagated over a second quantum channel, and separating again the received second quantum channel transfer signal into the idler light component and the auxiliary idler light component to output the light components; a first signal processor operative in response to the auxiliary idler light component received from said third optical splitter for producing a first control signal for adjusting at least one of values of intensity and/or wavelength of the excitation light, and temperature of said nonlinear optical medium such that a ratio in intensity of the auxiliary idler light component to the auxiliary signal light component becomes substantially equal to a predetermined value, and for producing a first electrical auxiliary idler signal converted from the auxiliary idler light component; a second signal processor operative in response to the auxiliary idler light component received from said fourth optical splitter for producing a second control signal for adjusting at least one of the values of the intensity and/or wavelength of the excitation light, and the temperature of the nonlinear optical medium such that the ratio becomes substantially equal to the predetermined value, and for producing a second electrical auxiliary idler signal converted from the auxiliary idler light component; a first clock signal extractor for receiving the first electrical auxiliary idler signal to output a first clock signal; a second clock signal extractor for receiving the second electrical auxiliary idler signal to output a second clock signal; a first receiver operative in time with the first clock signal for converting the signal light component to a corresponding electrical reception signal; and a second receiver operative in time with the second clock signal for converting the idler light component to a corresponding electrical idler signal.

Still further in accordance with the present invention, a quantum key delivery system may be similar to the quantum key delivery system described above except that the excitation light and the auxiliary signal light are directly applied to the nonlinear optical medium, which is arranged without providing the optical loop path, and that the light emerging from the optical medium is directly applied to the first optical splitter.

Specifically, the quantum key delivery system described immediately above is thus similar in structure except that there is no optical loop path and the excitation light and auxiliary signal light are combined into one, which is in turn applied to the nonlinear optical medium, and that the output light from the nonlinear optical medium is separated by the first optical splitter into the signal light component, auxiliary signal light component, idler light component and auxiliary idler light component. In the quantum key delivery system, the excitation light may preferably be composed of a couple of consecutive optical pulses.

According to the quantum key delivery systems of the present invention, the first through sixth steps of the quantum key delivery method are carried out in the following constituent elements. Specifically, the first step is performed by an excitation light source, an auxiliary signal light source and the first optical coupler. The second step is performed by the first optical splitter. The third step is performed by the first signal processor. The fourth step is carried out by the second signal processor, and the sixth step is carried out by the first clock signal extractor, the first receiver, the second clock signal extractor, and the second receiver. The fifth step is performed by adjusting the intensity of the excitation light, the wavelength of the excitation light, or the temperature of the nonlinear optical medium based on a control signal from either of first and second control signal generators.

According to the quantum key delivery method of the present invention, the excitation light and auxiliary signal light are simultaneously applied to the nonlinear optical medium. The intensities of the auxiliary signal light component and the auxiliary idler light component outputted from the medium are detected. Control is provided such that the ratio in intensity of the auxiliary idler light component to the auxiliary signal light component becomes substantially equal to a predetermined value.

The ratio in intensity of the auxiliary idler light component to the auxiliary signal light component is the conversion efficiency of the DFG. Since the relationship between the intensity ratio and the expected value of the probability in generating pairs of correlated photons is proportional to each other as will be described later, control is continuously made such that the ratio becomes substantially equal to the predetermined value, whereby pairs of correlated photons with a substantially constant expected value can be kept produced stably.

If it is assured by means of modularization or other means that the intensity of the auxiliary signal light outputted from the nonlinear optical medium is stabilized, detection of only the intensity of the auxiliary idler light component can keep stably producing pairs of correlated photons with a certain expected value so as to maintain the intensity of the auxiliary idler light component at a predetermined value. This can be sufficiently anticipated when using a normal optical module. Accordingly, in the following description, it is assumed that the intensity of the auxiliary signal light is stable, or substantially constant, to the extent that a measured value of the intensity of the auxiliary idler light can be used in place of the DFG conversion efficiency.

Furthermore, if it is required by a system to measure the intensity of auxiliary signal light, an optical splitter functioning as directing signal and idler light wavelength components to respective optical paths, as will be described later, may be provided with an additional output port for the auxiliary signal light in order to measure the intensity of the auxiliary signal light on that port. Additionally, according to the quantum key delivery method of the present invention, from the auxiliary idler signal, a clock signal is extracted, in synchronism with which an electrical reception signal is received.

Accordingly, the quantum key delivery method of the present invention makes it possible to indirectly monitor an expected value of the number of generated pairs of correlated photons, and to control the state based on the result of the monitoring in such a way that the expected value of pairs of quantum correlated photons generated which controls the process where the pairs of correlated photons are generated is maintained substantially constant over a long term, with the function of extracting a clock signal for use in detecting arrival of photons being attained.

According to the quantum key delivery systems of the invention, the first signal processor produces the first control signal for providing control such that the ratio in intensity of the auxiliary idler light component to the auxiliary signal light component becomes substantially equal to a predetermined value. The second signal processor produces the second control signal for providing control such that the ratio in intensity of the auxiliary idler light component to the auxiliary signal light component becomes substantially equal to a predetermined value.

In a case where it is assumed that the intensity of the auxiliary signal light component is stable, the first and second control signals for providing control so as to maintain the intensity of the auxiliary idler light component at predetermined values are produced from the first and second signal processors, respectively. As stated previously, when it is required by a system to measure the intensity of the auxiliary signal light, the afore-mentioned optical splitter functioning as directing the signal and idler light wavelength components to the respective optical paths may be equipped with the additional output port for the auxiliary signal light in order to measure the intensity of the auxiliary signal light on that port. The first clock signal extractor generates a first clock signal, in time with which the first receiver produces an electrical reception signal. The second clock signal extractor generates a second clock signal, in time with which the second receiver produces an electrical idler signal.

BRIEF DESCRIPTION OF THE DRAWINGS

The objects and features of the present invention will become more apparent from consideration of the following detailed description taken in conjunction with the accompanying drawings in which:

FIG. 1 is a schematic block diagram useful for understanding the operating principle of, and showing the fundamental configuration of implementing the function of, generating quantum correlated photon pairs in a quantum key delivery system in accordance with the present invention;

DESCRIPTION OF THE PREFERRED EMBODIMENTS

Figure 3A:
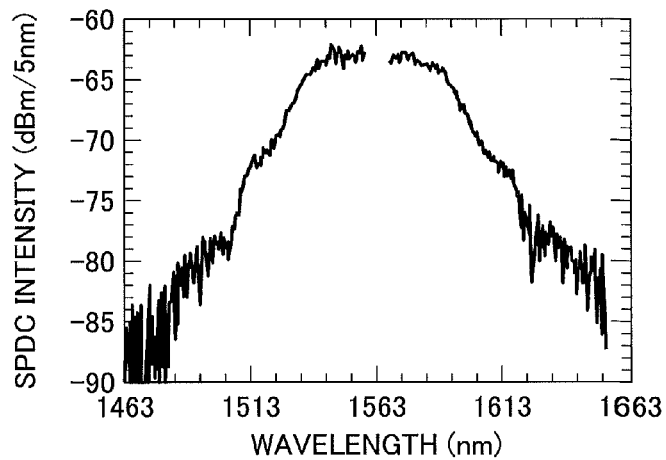
FIGS. 3A, 3B and 3C plot, like FIGS. 2A, 2B and 2C, the experimental results on generating correlated photon pairs by a cascaded SHG (second harmonic generation)/SPDC method and by a cascaded SHG/DFG method, FIG. 3A plotting a optical spectrum of cascaded SHG/SPDC light under the conditions where QPM conditions are satisfied, FIG. 3B plotting the dependency of the DFG conversion efficiency on the intensity of excitation light under the conditions where the QPM conditions are satisfied, FIG. 3C plotting the dependency of the DFG conversion efficiency on the wavelength of the excitation light under the conditions where the intensity of the excitation light is substantially constant.
Figure 3B:
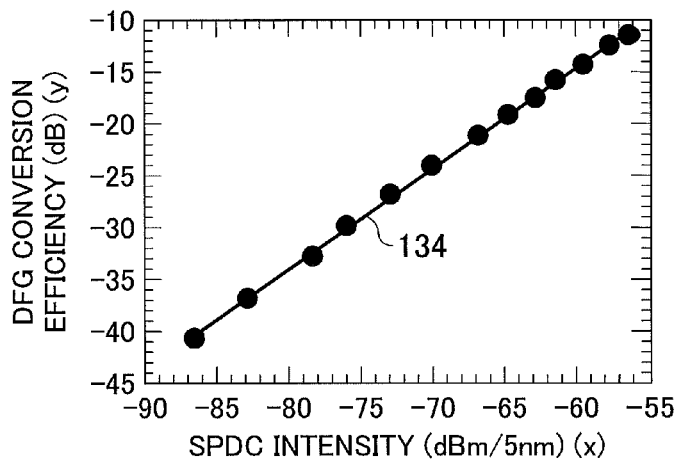
Figure 3C:
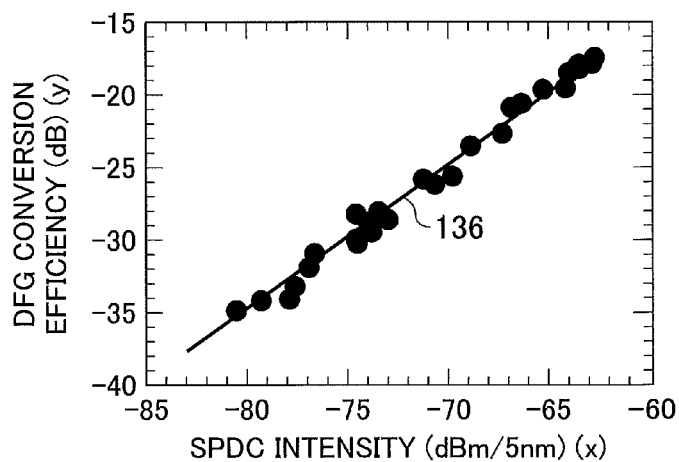
Figure 4:
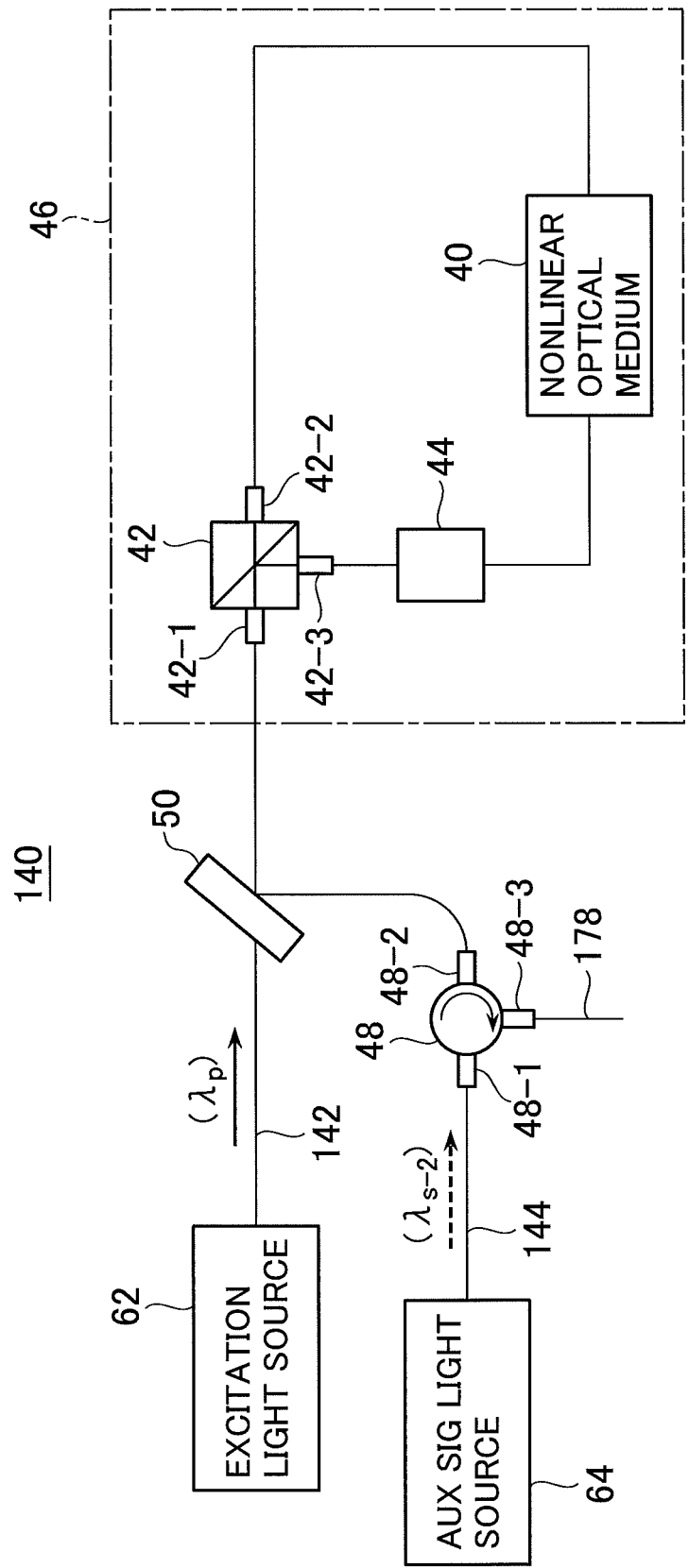
FIGS. 4 and 5 are schematic block diagrams showing, when combined, the configuration of a quantumkey delivery system according to an illustrative embodiment of the present invention.
Figure 5:
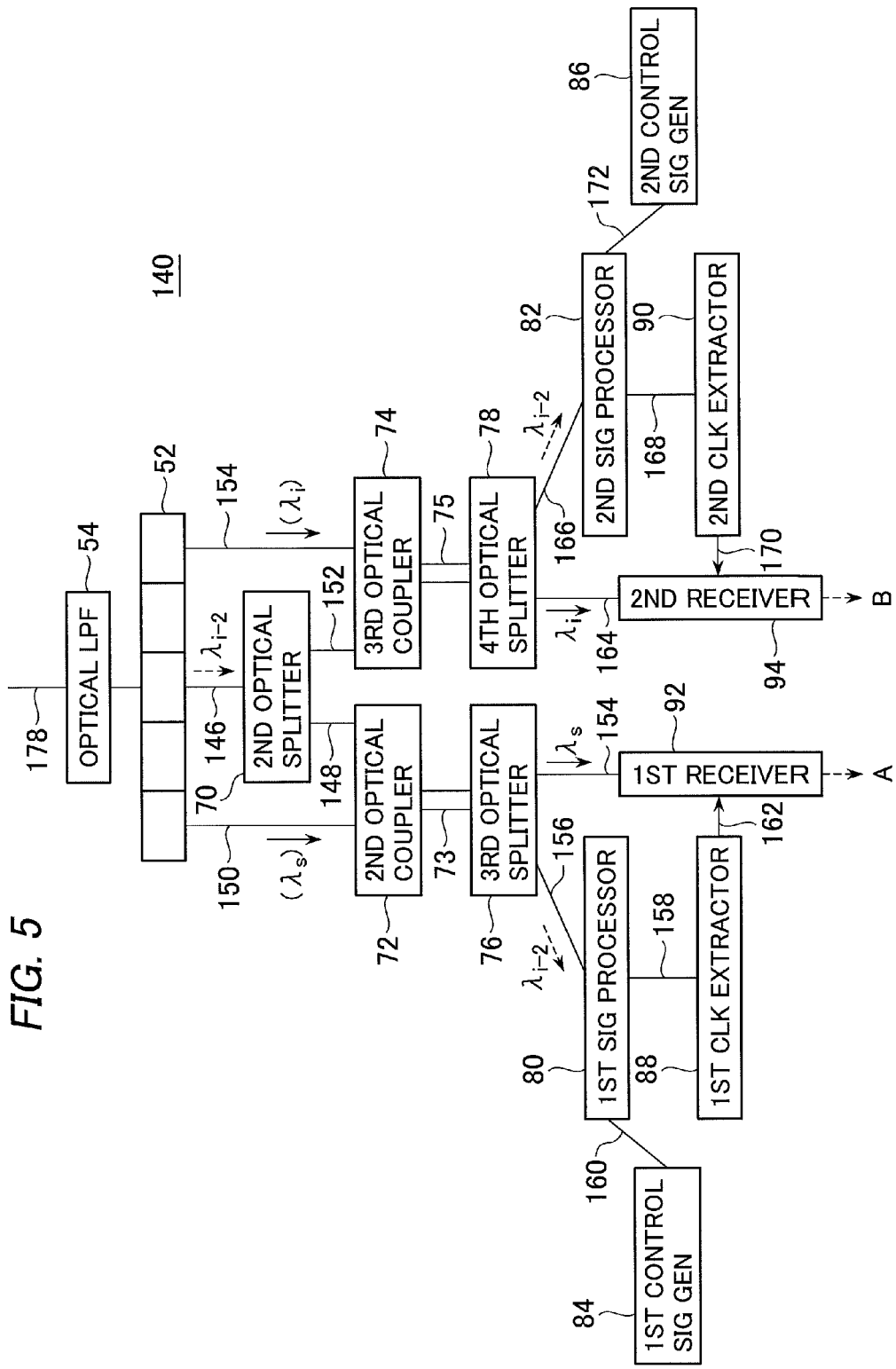
Figure 6:
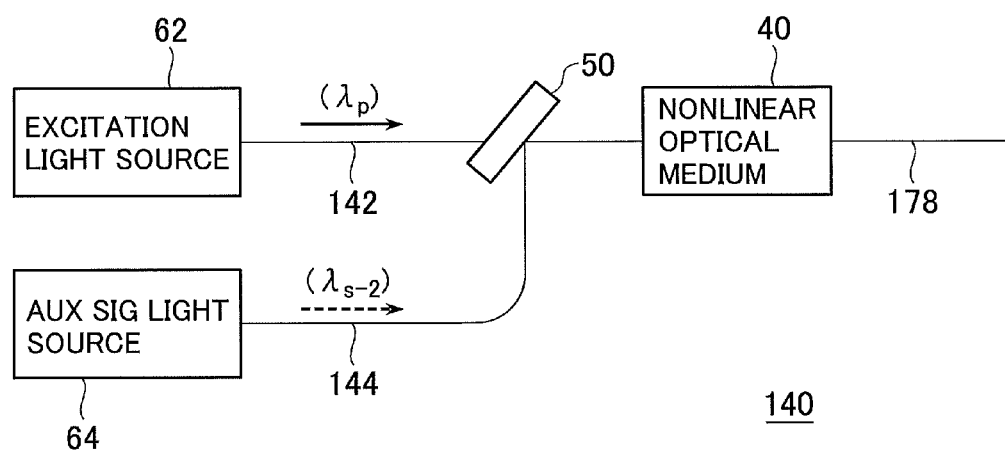
FIG. 6 is a schematic block diagram showing part of the configuration of a quantum key delivery system according to an alternative embodiment of the invention.

Preferred embodiments of the present invention will be described with reference to FIGS. 1-6. In the following description, specific devices and operating conditions may be taken as examples, which may, however, merely form some preferred examples, and therefore the invention may not be limited to them. FIGS. 4, 5 and 6 show examples of configuration associated with the invention, and merely schematically depict the layout relationship between the components to such an extent that the invention can be understood. The invention may not be limited to the illustrative embodiments.

Referring first to FIG. 1, description will be made on a fundamental configuration and its operating principle of implementing the function of generating pairs of quantum correlated photons, the function being incorporated in a quantum key delivery system of the invention when being in use. Generally, the fundamental configuration for accomplishing the function of generating pairs of quantum correlated photons may comprise a nonlinear optical medium 20, an excitation light source 12 for generating excitation light beam 102, an auxiliary signal light source 14 for generating auxiliary signal light beam 104, an optical coupler 16 for combining the excitation light 102 with the auxiliary signal light 104 to output a resultant combined light beam 106, a first optical coupler 18 for transferring the output light 106 received from the optical coupler 16 to the optical medium 20 as a beam 108, a second optical coupler 28 for coupling output light rays 110 emerging from the optical medium 20 into a light beam 112, an optical splitter 22 for separating an auxiliary signal light component 114 and an auxiliary idler light component 116 included in the output light 112 from the latter to output them, a first photodetector 24 for detecting the intensity of the auxiliary signal light component 114, a second photodetector 26 for detecting the intensity of the auxiliary idler light component 116, and a control signal generator section 30. As will be described later in detail, an optical device implementing the first photodetector 24 may not always be required in the inventive quantum key delivery system, those components being interconnected as depicted. Signals are designated with reference numerals of interconnections on which they are conveyed.

The excitation light source 12 functions as generating the excitation light beam 102 having a wavelength of $\lambda_p$, a wave number of $k_p$, and an optical angular frequency of $\omega_p$. The auxiliary signal light source 14 functions as generating the auxiliary signal light beam 104 having a wavelength of $\lambda_{s\text{-}2}$, a wave number of $k_{s\text{-}2}$, and an optical angular frequency of $\omega_{s\text{-}2}$.

The nonlinear optical medium 20 is responsive, on one hand, to the excitation light beam 108 incident thereon to produce pairs of quantum correlated photons based on spontaneous parametric fluorescence, each pair consisting of a signal photon having a wavelength of $\lambda_s$, a wave number of $k_s$, and an optical angular frequency of $\omega_s$ and an idler photon having a wavelength of $\lambda_i$, a wave number of $k_i$ and an optical angular frequency of $\omega_i$, and, on the other hand, to the auxiliary signal light 104 incident thereon to produce auxiliary idler light having a wavelength of $\lambda_{i\text{-}2}$, a wave number of $k_{i\text{-}2}$ and an optical angular frequency of $\omega_{i\text{-}2}$, through the process of stimulated parametric conversion.

As a result of directing the excitation light 102 having the wavelength of $\lambda_p$, wave number of $k_p$ and optical angular frequency of $\omega_p$ onto the nonlinear optical medium 20, pairs of correlated photons are produced owing to spontaneous parametric fluorescence, each pair consisting of the signal photon having the wavelength of $\lambda_s$, wave number of $k_s$ and optical angular frequency of $\omega_s$, and the idler photon having the wavelength of $\lambda_i$, wave number of $k_i$ and optical angular frequency of $\omega_i$, the photons satisfying relations corresponding to the law of conservation of momentum and the law of conservation of energy.

Furthermore, the auxiliary signal light 104 having the wavelength of $\lambda_{s\text{-}2}$, wave number of $k_{s\text{-}2}$, and optical angular frequency of $\omega_{s\text{-}2}$ is also entered into the nonlinear optical medium 20 together with the excitation light 102. Consequently, owing to DFG, the auxiliary idler light is produced which has the wavelength of $\lambda_{i\text{-}2}$, wave number of $k_{i\text{-}2}$, and optical angular frequency of $\omega_{i\text{-}2}$ which satisfy relations corresponding to the law of conservation of momentum and the law of conservation of energy.

More specifically, when a second-order nonlinear optical medium is used, the wave numbers and optical angular frequencies of the auxiliary signal light and the auxiliary idler light satisfy the following Expressions (5) and (6):

$$k_p = k_{s\text{-}2} + k_{i\text{-}2} + K \tag{5}$$

$$\omega_p = \omega_{s\text{-}2} + \omega_{i\text{-}2} \tag{6}$$

When the second-order nonlinear optical medium is used, FWM is used to generate the auxiliary idler light. Then, the following Expressions (7) and (8) are also satisfied:

$$2k_p = k_{s\text{-}2} + k_{i\text{-}2} + K \tag{7}$$

$$2\omega_p = \omega_{s\text{-}2} + \omega_{i\text{-}2}, \tag{8}$$

where K included in Expressions (1) and (3) is a parameter corresponding to the period of a structure where nonlinear optical coefficients are modulated periodically.

In the quantum key delivery system of the invention, the auxiliary idler light may be used as a signal for extracting a clock signal by a recipient.

The auxiliary signal light component 114 and the auxiliary idler light component 116 outputted from the nonlinear optical medium 20 are detected by the first photodetector 24 and second photodetector 26, respectively. The output signals 118 and 120 from the first and second photodetectors 24 and 26 which indicate the intensities of the auxiliary signal light component 114 and the auxiliary idler light component 116, respectively, will in turn be applied to the control signal generator section 30, which includes an output comparator 30-1 and a control signal generator 30-2, as interconnected as shown.

The signals 118 and 120 indicating the intensities of auxiliary signal light component and the auxiliary idler light component are first applied to the output comparator 30-1.

The comparator 30-1 serves as producing a signal 122 proportional to the ratio in intensity of the auxiliary idler light component 114 to the auxiliary signal light component 116 to the control signal generator 30-2. The control signal generator 30-2 outputs a control signal 124 for use by a system controller 138 in adjusting at least one of the values of the intensity and/or wavelength of the excitation light 102 over a control connection 174, and the temperature of the nonlinear optical medium 20 over another control connection 176.

The illustrative embodiment is depicted and described as configured by separate functional blocks, such as control signal generator 30-2 and system controller 138. It is, however, to be noted that such a depiction and a description do not restrict those blocks to an implementation only in the form of hardware but they may partially or entirely be implemented by software, namely, by a computer, or processor system, which has a computer program installed and functions, when executing the computer program, as part of, or the entirety of, those functional blocks. That may also be the case with alternative embodiments which will be described below.

If the intensity of the auxiliary signal light 104 outputted from the auxiliary signal light source 14 is stable, and an optical coupling system including the optical coupler 16, first optical coupler 18 and second optical coupler 28 are stabilized by modularization or other means, then the intensity of the auxiliary signal light outputted from the optical medium 20 is also stable. In this case, the output signal 118 from the first photodetector 24 should be substantially constant, and so the output signal 118 from the first photodetector 24 can be replaced by an electrical signal of a substantially constant value. Therefore, the first photodetector 24 may not always be essential.

It is, however, possible that the intensity of the auxiliary signal light outputted from the optical medium 20 may fluctuate for some reason or other. Therefore, the intensity of the auxiliary signal light outputted from the medium 20 may be detected by the first photodetector 24 at all times, and the ratio in intensity of the auxiliary idler light component to the auxiliary signal light component may be used as a reference in producing the control signal 124. The quantum key delivery systems according to the illustrative embodiments of the invention, which will be described later, do not use the first photodetector 24. However, a system configuration inherently requiring the first photodetector 24, i.e. requiring the intensity of the auxiliary signal light to be measured, may be employed through a simple technique as will be described later.

The first and second photodetectors 24 and 26, and control signal generator section 30 are shown in FIG. 1 merely for the purpose of understanding the fundamental operation of the system as to how to monitor and control pairs of correlated photons being generated, and to generate the clock signal. The quantum key delivery systems of the illustrative embodiments of the invention, described later, incorporate the function of generating pairs of quantum correlated photons in a form slightly different from the configuration described in connection with FIG. 1.

Now, description will be made on experiment for verifying operation of the fundamental configuration for generating pairs of quantum correlated photons. In an experiment conducted to verify the operation of the fundamental configuration, a periodically poled substrate of $LiNbO_3$ having a stoichiometric composition with MgO doped was used as the nonlinear optical medium 20. A periodically-poled lithium niobate (PPLN) waveguide device was used in which an optical waveguide was fabricated through proton exchange and dicing to form ridges. The length of the PPLN device was 6 cm. The width of the ridges was 10 μm. The period Λ of the periodically poled structure was set to 19.6 μM. The period Λ was so set that, when a second harmonic generation (SHG) was raised by the PPLN waveguide device, the wavelength of the excitation light at which the SHG (second harmonic generation) output was maximized was 1562.75 nm. That wavelength may be referred to as QPM wavelength. Note that the length of the PPLN device, the period Λ and other values can be set at will and those specific values may not restrict the configuration of the invention. The magnitude of the propagation loss of the fabricated PPLN waveguide device was in the order of 0.1 dB/cm with respect to light in the 1550-nm band.

The experiment for the verification was conducted using an optical PPLN module in which the PPLN waveguide device was modularized together with a temperature controlling device, in particular, a Peltier cooler, coupling lenses, and optical fiber for inputting and outputting light beams. The optical insertion loss of this PPLN module was about 3.7 dB for light in the 1,560-nm band.

(1) Normal SPDC Process

First, excitation light having a wavelength of 781.375 nm that was a half of 1562.75 nm of QPM wavelength was applied to the PPLN module. An optical spectrum of the output light from the PPLN module was measured. As a result, measured was an optical spectrum of pairs of correlated photons generated by a simple, normal SPDC process (one-stage SPDC process) satisfying relations given by the above Expressions (1) and (2). The wavelength resolution of an optical spectrum analyzer for use in this measurement was set to 5 nm. The input intensity of the excitation light incident on the PPLN module was measured immediately ahead of the input of the PPLN module and set to +15 dBm.

The results of the verification experiment will be described by referring to FIGS. 2A, 2B and 2C, which plot experimental results indicating correlative relationships between the intensity of output light produced in an SPDC process and the DFG conversion efficiency.

Figure 2A:
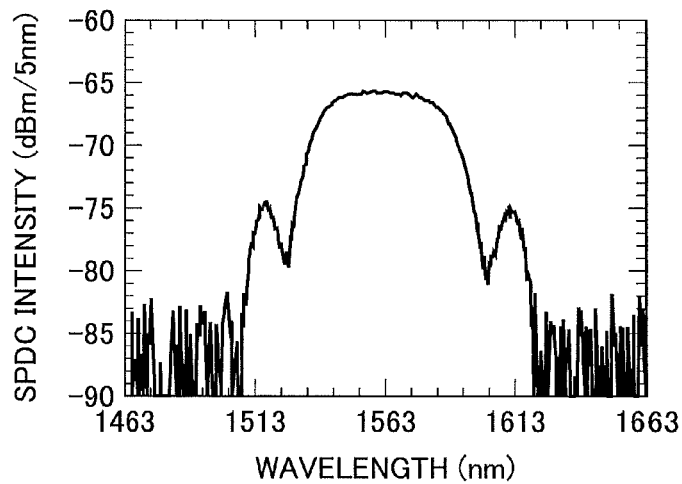
FIGS. 2A, 2B and 2C plot the experimental results of correlative relationships between the intensity of output light produced in an SPDC process and the DFG conversion efficiency, FIG. 2A plotting an optical spectrum of SPDC light under the conditions where QPM (quasi-phase matching) conditions are satisfied, FIG. 2B plotting the dependency of the DFG conversion efficiency on the intensity of excitation light under the conditions where QPM conditions are satisfied, FIG. 2C plotting the dependency of the DFG conversion efficiency on the wavelength of excitation light under the conditions where the intensity of the excitation light is substantially constant.

FIG. 2A plots an optical spectrum of SPDC light produced under the conditions where the QPM conditions were met. The optical spectrum was observed which spread symmetrically about the QPM wavelength (1562.75 nm). This shows a spectral distribution of pairs of correlated photons produced in the SPDC process, and indicates that pairs of correlated photons of various combinations of wavelengths satisfying the relation of Expression (2) were produced. The optical spectral intensity of the observed SPDC light is interpreted as proportional to the probability at which pairs of correlated photons in each combination of wavelengths were produced.

Furthermore, while varying the intensity or wavelength of the excitation light, optical spectra of the SPDC light were measured. Measurement was made on the intensity of the SPDC light at a wavelength spaced by +10 nm from the wavelength of the excitation light. This is equivalent to measuring the probability at which pairs of correlated photons are generated at the wavelength spaced by +10 nm under each set of measuring conditions, i.e. to measuring the expected value of the generation.

Then, together with the excitation light, auxiliary signal light was simultaneously directed to the PPLN module to observe an optical spectrum of the output light emerging from the PPLN module. Whenever a measurement was made, the wavelength of the auxiliary signal light was set to be spaced by +10 nm from the wavelength of the excitation light. From the observed optical spectrum, measurement was made on the intensities of the output auxiliary signal light and the auxiliary idler light produced at the angular position of the optical frequency satisfying Expression (6). The ratio in intensity of the auxiliary idler light to the intensity of the auxiliary signal light is now defined as the wavelength conversion efficiency owing to DFG.

Then, as in the above example, while varying the intensity or wavelength of the excitation light, the wavelength conversion efficiency was measured. From those experimental data, the relationship between the SPDC light intensity and the wavelength conversion efficiency owing to DFG was plotted to draw FIGS. 2B and 2C.

Figure 2B:
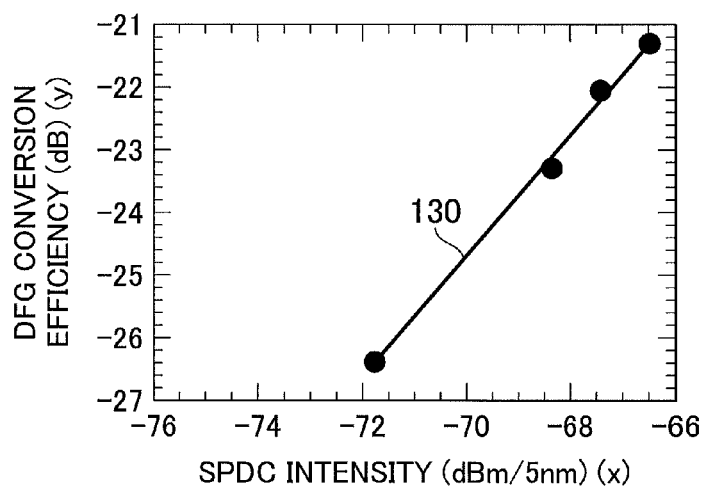

FIG. 2B shows the relation of the DFG conversion efficiency to the intensity of the SPDF light. The relation was measured while varying the intensity of the excitation light with the wavelength of the excitation light maintained at a half (781.375 nm) of the QPM wavelength (1562.75 nm), namely, under the conditions where the QPM conditions were satisfied. FIG. 2C shows the relation of the DFG conversion efficiency to the SPDC light intensity when the intensity of the excitation light was fixed at +15 dBm and the wavelength of the excitation light was varied. The results shown in FIG. 2C were obtained under the conditions where the aforementioned pseudo phase matching conditions of Expression (1) were not strictly satisfied for the excitation light, signal light and idler light.

Figure 2C:
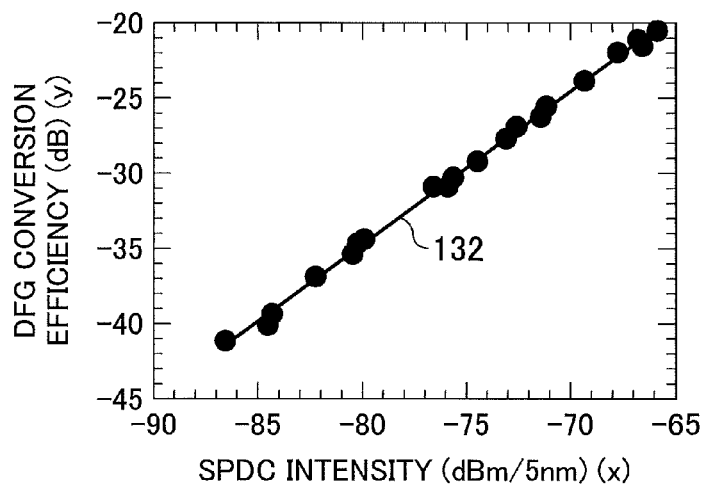

It has been confirmed from the results shown in FIGS. 2B and 2C that there is a proportional relationship between the intensity of the SPDC light and the wavelength conversion efficiency owing to DFG. Incidentally, in FIG. 2B, if the intensity of the SPDC light and the DFG conversion efficiency are indicated by x and y, respectively, then their relationship may be approximated by a straight line 130, given by y=0.98217x+44.033, which represents a linear, proportional relation established between x and y. In FIG. 2C, if the intensity of the SPDC light and the DFG conversion efficiency are similarly indicated by x and y, respectively, then their relationship may be approximated by a straight line 132, given by y=1.0055x+45.742, which also represents a linear, proportional relation established between x and y. The relations reveal that both straight lines 130 and 132 have the respective gradient thereof, 0.98217 and 1.0055, which are almost equal to each other. It can thus be seen that agreement is established in terms of the proportionality coefficient under both conditions shown in FIGS. 2B and 2C.

The results shown in FIGS. 2B and 2C indicate that there is a proportional relation established between the expected value of the probability at which pairs of correlated photons are produced and the wavelength conversion efficiency owing to DFG, and furthermore that the proportionality coefficient is independent of the presence of phase matching.

(2) Cascaded SHG/SPDC Process

The applicant has already reported the results of a research on a cascaded SHG/SPDC process brought about by the fact that SHG and SPDC were caused in a single, second-order nonlinear optical medium as a process where pairs of correlated photons are produced in Shin Arahira, et al., "Parametric down conversion through cascaded $\chi^{(2)}$ process in a PPLN ridge waveguide", Material on 21st Research Society on Quantum Information Technology, Time-Limited Research Expert Committee on Quantum Information, The Institute of Electronics, Information and Communication Engineers of Japan, pp. 184-187 (2009).

According to the solution described in Shin Arahira, et al., when a PPLN device receives excitation light, the PPLN device first generates SHG light thereinside. The SHG light is in turn used as seed light to thereby generate pairs of correlated photons through an SPDC process. The SHG/SPDC process can be regarded as a pseudo, third-order nonlinear optical effect. The wave number and the optical angular frequencies of the input excitation light and the generated pairs of correlated photons (signal and idler lights) satisfy relations given by the above Expressions (3) and (4).

It is known that there is established a cascaded SHG/DFG process corresponding to the aforementioned normal relation between the SPDC process and DFG. Rather, the cascaded SHG/DFG process is more notorious to the researchers. More specifically, if auxiliary signal light and excitation light are simultaneously entered into a nonlinear optical medium to induce a cascaded SHG/DFG process, then auxiliary idler light is produced which has its optical angular frequency satisfying the above Expression (8).

Then, using the same PPLN device as used in the experiments producing the results shown in FIGS. 2A, 2B and 2C, experiments on generating pairs of correlated photons were performed through cascaded SHG/SPDC and SHG/DFG processes. More specifically, while varying the intensity and wavelength of the input excitation light, the intensity of SPDC light generated by the cascaded SHG/SPDC process was measured. The input excitation light was of a wavelength close to the QPM wavelength of 1532.75 nm. Subsequently, excitation light and auxiliary signal light were simultaneously entered into the nonlinear optical medium, and the wavelength conversion efficiency owing to the cascaded SHG/DFG process was measured.

Also similarly in the aforementioned verification experiment for generating pairs of correlated photons during a normal SPDC process, while the intensity or wavelength of the excitation light was made varied, optical spectra of SPDC light were measured. Then, the intensity of SPDC light at a wavelength spaced by +10 nm from the wavelength of the excitation light was measured. Thereafter, together with the excitation light, auxiliary signal light was simultaneously entered into the PPLN module, and optical spectra of the output light emitted from the PPLN module were observed. In each measurement, the wavelength of the auxiliary signal light was set also to a wavelength spaced by +10 nm from the wavelength of the excitation light.

Now, referring to FIGS. 3A, 3B and 3C, the results of experiments on generating pairs of correlated photons through cascaded SHG/SPDC and SHG/DFG processes will be described. FIGS. 3A, 3B and 3C plot the results of experiments indicating the correlative relation between the intensity of output light produced in the SPDC process and the DFG conversion process. FIG. 3A plots an optical spectrum of SPDC light under the conditions where the wavelength of the excitation light was the QPM wavelength (1562.75 nm) and the QPM conditions were satisfied. FIG. 3B plots the relation of the DFG conversion efficiency to the intensity of the SPDC light when the wavelength of the excitation light was fixed at the QPM wavelength (1562.75 nm) and the intensity of the excitation light was varied. FIG. 3C plots the relation of the DFG conversion efficiency to the intensity of the SPDC light when the intensity of the excitation light was fixed at +15 dBm and the wavelength of the excitation light was varied.

It has been confirmed from the results shown in FIGS. 3B and 3C that there is a proportional relationship between the intensity of cascaded SHG/SPDC light and the wavelength conversion efficiency owing to the cascaded SHG/DFG. In FIG. 3B, if the SPDC light intensity and DFG conversion efficiency are indicated by x and y, respectively, then their relationship may be approximated by a straight line 134, expressed by y=0.97976x+44.284, which represents a linear, proportional relation established between x and y. Similarly in FIG. 3C, if the intensity of the SPDC light and the DFG conversion efficiency are indicated by x and y, respectively, then their relationship may be approximated by a straight line 136, given by y=0.99326x+44.839, which is also a linear, proportional relation established between x and y. The relations reveal that both straight lines 134 and 136 have the respective gradients, 0.97976 and 0.99326, which are almost equal to each other. It can thus be seen that agreement is established in terms of the proportionality coefficient under both conditions shown in FIGS. 3B and 3C.

The results shown in FIGS. 3B and 3C indicate that there is a proportional relation established between the expected value of the probability at which pairs of correlated photons are produced and the wavelength conversion efficiency owing to DFG, and further that the proportionality coefficient is independent of the presence of phase matching.

The applicant attempted experiments similar to the foregoing experiments while changing the length of the PPLN device and the structure of the optical waveguide of the PPLN device. The results confirmatively demonstrate that the proportional relation between the expected value of the probability at which pairs of correlated photons are generated and the wavelength conversion efficiency owing to DFG and its proportionality coefficient are independent of the length and waveguide structure of the PPLN device.

More specifically, the applicant has gained the knowledge under the following paragraphs (A) and (B) through the aforementioned verification experiments.

(A) There is a proportional relation between the expected value of the probability at which pairs of correlated photons will be produced by an SPDC process and the wavelength conversion efficiency owing to DFG. This relation holds in normal SPDC processes and also in cascaded SHG/SPDC processes. Furthermore, it is estimated that this proportional relation will also hold in the relation between SFWM (spontaneous four wave mixing) and the SFWM. conversion efficiency for auxiliary idler light in a third-order nonlinear optical medium.

(B) The proportionality coefficient neither depends upon whether or not the conditions of phase matching, including pseudo phase matching, are strictly be satisfied, nor upon structural parameters as defining the length of the device producing pairs of correlated photons such as a PPLN device or the structure of the optical waveguide. Therefore, so far as the composition of the nonlinear optical medium constituting a device producing pairs of correlated photons remains the same, the proportionality coefficient will be the same.

Now, a mode of operation for generating pairs of quantum correlated photons will be described. Specifically, the mode of operation of a quantum correlated-photon pair generator according to an embodiment of the present invention using a second-order nonlinear optical medium will be described by referring again to FIG. 1. A similar description may also be applied to a similar quantum correlated-photon pair generator using a third-order nonlinear optical medium. It is to be noted that, so far as a quantum correlated-photon pair generator configured by employing a third-order nonlinear optical medium is concerned, the mode of operation may be the same with the words "SPDC" and "DFG" in the following description replaced by "FWM" and "SFWM", respectively.

Excitation light, acting as a source of generating pairs of correlated photons and raising the SPDC process, is generated from the excitation light source 12, and auxiliary signal light for producing auxiliary idler light through DFG (differential-frequency generation) with that excitation light is generated from the auxiliary signal light source 14. The excitation light and auxiliary signal light are combined with each other, and simultaneously entered into the nonlinear optical medium 20. Since the nonlinear optical medium 20 is a second-order nonlinear optical medium in this example, the medium 20 may sometimes be referred to as the second-order nonlinear optical medium 20.

The first optical coupler 18, FIG. 1, is an optical system including lenses for causing the light beam 106, resultant from the optical coupler 16 combining the excitation light 102 with the auxiliary signal light 104, to be simultaneously entered into the second-order nonlinear optical medium 20. The first optical coupler 18 can be configured using a semi-transparent mirror, a wavelength multiplexing filter or the like.

From the second-order nonlinear optical medium 20, pairs of correlated photons of signal light and idler light, auxiliary signal light, and auxiliary idler light, by means of which correlated photons are generated in cooperative with the excitation light, are outputted to the second optical coupler 28. Of these rays of light, only wavelength components corresponding to the auxiliary signal light 114 and auxiliary idler light 116 are separately taken out by the optical splitter 22.

On the other hand, the wavelength components corresponding to the pairs of correlated photons, i.e. signal light 180 and idler light 182, are taken out also by the optical splitter 22, separately from the wavelength components corresponding to the auxiliary signal light 114 and auxiliary idler light 116. This operation for taking out the wavelength components may be implemented using an arrayed waveguide grating (AWG) filter that is known per se.

The intensities of the auxiliary signal light and auxiliary idler light which have been taken out isolatedly from each other will be sensed by the first and second photodetectors 24 and 26, respectively. Intensity signals outputted from the first and second photodetectors 24 and 26 are, respectively, applied to the output comparator 30-1, which in turn produces an intensity ratio signal 122 indicating the ratio between both intensities to the control signal generator 30-2. The control signal generator 30-2 is responsive to the intensity ratio signal 122 to produce a control signal 124 for adjusting the value of at least one of the intensity and/or wavelength of the excitation light, and the temperature of the nonlinear optical medium 20 such that the ratio between both intensities becomes equal to a predetermined value. In FIG. 1, mechanisms for controlling the intensity and wavelength of the excitation light, and the temperature of the nonlinear optical medium 20 are omitted from illustration.

Thus, if the intensity ratio signal 122 to be outputted from the output comparator 30-1 is controlled so as to become equal to the predetermined or reference value, the expected value of the probability in generating pairs of correlated photons will be stabilized at a desired value predetermined.

One of the solutions for providing control such that the intensity ratio signal 122 developed from the output comparator 30-1 is stabilized at a certain prescribed value may be to produce by the control signal generator 30-2 a control signal 124 responsive to the amount of deviation of the intensity ratio signal from the predetermined value, thus adjusting the output intensity of the excitation light source 12 by the control signal 124 by the system controller 138. This solution can be implemented by providing a feedback control, known per se, in response to the intensity signal.

Alternatively, as will be described later, the solution may also be accomplished by a method of adjusting the output wavelength of the excitation light source 12 in response to the control signal 124 to thereby give a deviation from the phase matching condition.

In a normal DFG method not relying on a cascaded method, the DFG conversion efficiency, and hence the expected value of the probability of occurrence of pairs of correlated photons, is in proportion to the intensity of the excitation light. Consequently, adjustment of the intensity of the excitation light effects the above-described control.

By contrast, in the cascaded SHG/DFG, the DFG conversion efficiency is in proportion to the square of the intensity of the excitation light, and so the above-described control is enabled by adjusting the intensity of the excitation light.

Since the efficiency of the nonlinear optical effect caused by the second-order nonlinear optical medium 20 depends on the temperature, the above-described control can be effected also by rendering the temperature of the second-order nonlinear optical medium 20 to be controlled by the system controller 138 in response to the control signal 124.

Similarly, if the wavelength of the excitation light deviates from the phase matching condition, a deviation occurs from the phase matching conditions given by Expressions (1), (3), (5), and (7) defined above because of the refractive index dispersion in the second-order nonlinear optical medium 20, and, therefore, the DFG conversion efficiency depends on the wavelength of the excitation light. Furthermore, when the temperature of the second-order nonlinear optical medium 20 is varied, the phase matching condition varies due to the temperature dependency of the refractive index, thus varying the DFG conversion efficiency. This phenomenon is utilized to control the expected value of the probability in generating pairs of correlated photons through the control over the temperature of the second-order nonlinear optical medium 20 as described above.

A case will now be discussed in which pulsated light is used as the excitation light instead of continuous light. Generally in information communication systems, signals are transmitted and received in temporal synchronization, and it is therefore customary to use pulsated light as excitation light. In that case, a signal photon and an idler photon forming a pair of correlated photons are produced in the form of pulses in synchronism with an excitation light pulse. Auxiliary idler light is pulsated light even when the auxiliary signal light is continuous.

Those pulsated excitation light, signal light, idler light and auxiliary idler light are produced in temporal synchronization. Therefore, from the time at which the auxiliary idler light pulse arrives, it is possible to know the time at which the signal and idler photons arrive. From that fact, it is revealed that a synchronous detection of signal and idler photons may be accomplished by extracting a clock signal for the auxiliary idler light pulse and detecting signal and idler photons in synchronous with that clock signal allows.

Well, referring to FIGS. 4 and 5, description will be made on the configuration and operation of a quantum key delivery system 140 according to an illustrative embodiment of the present invention. The delivery system 140 includes an optical loop path 46 of the Sagnac interferometer type including a polarization separator/combiner 42. The optical loop path 46 includes therein a nonlinear optical medium 40 for producing pairs of correlated photons, and a 90-degree polarization plane rotator 44 for rotating the plane of polarization of linearly polarized light, when passing the rotator 44, by 90 degrees. The delivery system 140 further includes a first optical splitter 52 outside the optical loop path 46.

The optical loop path 46 may preferably be made of a type of optical system that preserves the wave of polarization. For example, the loop path 46 may advantageously be made of a polarization-preserving type of optical fiber. Alternatively, the loop path 46 may be implemented by optical systems spatially coupled by means of an optical coupling lens. Where, alternatively to a polarization-preserving fiber, the optical loop path 46 is configured in the form of optical module having normal optical fibers coupled together, not having polarization-preserving nature, an additional optical component such as a polarization-plane controller may appropriately be used to accomplish a pseudo-polarization-preserving optical system. The 90-degree polarization plane rotator 44 can be fabricated by an optical fiber fusing method, but may alternatively be made of a half-wavelength plate.

The quantum key delivery system 140 of the illustrative embodiment of the invention includes, in addition to the first optical splitter 52, an optical circulator 48, a first optical coupler 50 and an optical low-pass filter (LPF) 54, which serve as optical input-output components adapted for entering excitation light 142 and auxiliary signal light 144 to the optical loop path 46, and for extracting and outputting only the wavelength components of pairs of correlated photons outputted from the loop path 46. The excitation light 142 is generated by an excitation light source 62. The auxiliary signal light 144 is generated by an auxiliary signal light source 64.

The roles of the optical coupler 16, and first and second optical couplers 18 and 28 shown in FIG. 1 are implemented by the optical circulator 48, first optical coupler 50 and polarization separator/combiner 42 in the quantum key delivery system 140, FIGS. 4 and 5, according to the illustrative embodiment of the invention. The first optical splitter 52 corresponds to the optical splitter 22. The separator/combiner 42 has a first, a second and a third input-output port 42-1, 42-2 and 42-3.

The separator/combiner 42 is so arranged that a p-polarized component entered from the first input-output port 42-1 is outputted from the second input-output port 42-2, an s-polarized component entered from the first input-output port 42-1 is outputted from the third input-output port 42-3, a p-polarized component entered from the second input-output port 42-2 is outputted from the first input-output port 42-1, and an s-polarized component entered from the third input-output port 42-3 is outputted from the first input-output port 42-1. In the embodiment, the separator/combiner 42 superficially includes a fourth input-output port, not shown. The fourth input-output port serves as outputting the p-polarized component entered from the second input-output port 42-2 and the p-polarized component entered from the third input-output port 42-3, but is not shown in the figure because it is not necessary to use those components on the fourth port.

In particular, the optical loop path 46 is thus configured to include the nonlinear optical medium 40 and the 90-degree polarization plane rotator 44 so that the excitation light and auxiliary signal light are entered on the first input-output port 42-1 of the polarization separator/combiner 42 while the auxiliary signal light component, auxiliary idler light component, signal light component and idler light component are outputted from the first input-output port 42-1. The second input-output port 42-2 of the polarized wave separator/combiner 42 operates as the first optical coupler 18, FIG. 1, for the excitation light and auxiliary signal light propagating over the optical loop path 46 in a clockwise direction in FIG. 4, and operates as the second optical coupler 28, FIG. 1, for the excitation light and auxiliary signal light propagating over the path 46 in a counterclockwise direction also in FIG. 4. The third input-output port 42-3 of the polarized wave separator/combiner 42 operates as the first optical coupler for the excitation light and auxiliary signal light propagating on the loop path 46 in the counterclockwise direction, and operates as the second optical coupler 28 for the excitation light and auxiliary signal light propagating on the path 46 in the clockwise direction.

The polarization separator/combiner 42 may be appropriately selected for use from, for example, commercially available polarization separator/combiner units. Specifically, a polarization separator/combiner formed in a thin film device may be employed. Alternatively, a type of polarization separator/combiner including a so-called polarization prism employing a birefringent crystal may be used.

The quantum key delivery system 140 according to the illustrative embodiment further includes, in addition to the optical circulator 48, first optical coupler 50, first optical splitter 52 and optical low-pass filter 54, a second optical splitter 70, a second optical coupler 72 and a third optical coupler 74 which function as input-output optical components adapted for entering the excitation light and auxiliary signal light to the optical loop path 46, and for outputting the wavelength components of the correlated photon pairs outputted from the path 46.

The optical circular 48 has a first input port 48-1 for receiving the auxiliary signal light 144, a second input-output port 48-2 for outputting the input light inputted on the first input port 48-1 to the first optical coupler 50 for coupling, and a third input-output port 48-3 for outputting the input light entered from the second input-output port 48-2 on a connection 178.

The auxiliary signal light outputted from the second input-output port 48-2 of the optical circulator 48 is combined with the excitation light in the first optical coupler 50, and then applied to the first input-output port 42-1 of the polarization separator/combiner 42. One preferred example of the first optical coupler 50 may be an AWG filter. Alternatively, an optical bandpass filter in the form of dielectric multilayer filter may also be used as the first optical coupler 50. That is, if the excitation light is entered on the transmission port of the optical bandpass filter and the auxiliary signal light is entered on the reflection port, the excitation light and auxiliary signal light are combined and outputted on the common port. Description will be proceeded to in an application in which the first optical coupler 50 is implemented into an optical bandpass filter in the form of dielectric multilayer film filter.

The p-polarized components of the excitation light and auxiliary signal light are then outputted from the second input-output port 42-2 of the polarization separator/combiner 42 while the s-polarized component is outputted from the third input-output port 42-3. The p- and s-polarized components of the polarization-separated excitation light have to be equal in optical intensity to each other for the reason which will be described later on. For this purpose, the excitation light 142 entered into the first input-output port 42-1 of the polarization separator/combiner 42 has to be so adjusted in polarization that the ratio in intensity between the p- and s-polarized components is equal to 1:1. The excitation light 142 prepared in this way may be referred to as 45-degree polarized excitation light. Such excitation light can be easily created using a commercially available polarization plane controller.

By contrast, with respect to the state of polarization, the auxiliary signal light involves no restrictions corresponding to those on the excitation light, as will be described later.

The optical low-pass filter 54 acts, when the second-order nonlinear optical medium is used, to remove the excitation light component in the SPDC process or the SHG light component in the cascaded SHG/SPDC process.

The first optical splitter 52 acts to direct at least the signal light wavelength component ($\lambda_s$) and the idler light wavelength component ($\lambda_i$) out of the light transmitted through the optical low-pass filter 54 to the separate optical paths to output them. Furthermore, the splitter 52 also directs the auxiliary idler light wavelength component ($\lambda_{i-2}$) to a further optical path to output the component. The splitter 52 may be made of an AWG type wavelength division multiplexing (WDM) filter having its transmissive property capable of transmitting at least the aforementioned four wavelength components.

The auxiliary idler light component 146 having passed the first optical splitter 52 is divided into two by the second optical splitter 70. One output part 148 from the splitter 70 is combined with the signal light component 150 in the second optical coupler 72. The other output part 152 is combined with the idler light component 154 in the third optical coupler 74.

The combined light 73 of the signal light component 150 and auxiliary idler light component 148 outputted from the second optical coupler 72, and the combined light 75 of the idler light component 154 and auxiliary idler light component 152 outputted from the third optical coupler 74 are sent toward recipients A and B, respectively, over first and second quantum channels 73 and 75, respectively, which may be formed by optical fiber or a free space.

The signal light component and auxiliary idler light component transmitted over the first quantum channel 73 are again separated by a third optical splitter 76 into the signal light component 154 and the auxiliary idler light component 156. On one hand, the auxiliary idler light component 156 is received by a first signal processor 80, where the component 156 is converted into a corresponding, first electrical auxiliary idler signal, part 158 of which will be used by a first clock (CLK) extractor 88 to extract a first clock signal. The remainder 160 of the first electrical auxiliary idler signal outputted from the first signal processor 80 is applied to a first control signal generator 84, which in turn generates and outputs a first control signal 124, FIG. 1, responsive to the intensity of the input signal 160. On the other hand, the signal light component 154 outputted from the third optical splitter 76 is converted by a first receiver 92 into a corresponding electrical signal, which will be received by the recipient A in the form of electrical reception signal. At this time, a synchronous detection is carried out in time with the first clock signal 162 outputted from the first clock extractor 88.

Likewise, the idler light component and auxiliary idler light component transmitted over the second quantum channel 75 are again separated by a fourth optical splitter 78 into the idler light component 164 and the auxiliary light component 166. On one hand, the auxiliary idler light component 166 is received by a second signal processor 82, where the component 166 is converted into a corresponding, second electrical auxiliary idler signal, part 168 of which will be used by a second clock extractor 90 to extract a second clock signal 170. The remainder 172 of the second electrical auxiliary idler signal outputted from the second signal processor 82 is applied to a second control signal generator 86, which in turn generates and outputs a second control signal 124, FIG. 1, responsive to the intensity of the input signal 172. On the other hand, the idler light component 164 outputted from the fourth optical splitter 78 is converted by a second receiver 94 into a corresponding electrical signal, which will be received by the recipient B in the form of electrical idler signal. At this time, a synchronous detection is effected in time with the second clock signal 170 outputted from the second clock extractor 90.

The first and second control signals 124 are used, respectively, over first and second classical channels, not shown, to adjust by the system controller 138, FIG. 1, at least any one of the values of the intensity and/or wavelength of the excitation light 142 outputted from the excitation light source 62, symbolically depicted with the control line 174 and the temperature of the nonlinear optical medium 40, also symbolically depicted with the control line 176. To the adjusting method employing the first and second control signals 124, a control method using a feedback technology known per se may appropriately be applied, its detailed description being omitted. In practice, the first and second control signals 124 are outputted in the form of measurements of the intensity of the auxiliary idler light, and not in the form of intensity ratio, as desired itself, between the auxiliary signal light and auxiliary idler light. However, as far as the quantum correlated-photon pair generator is stabilized in the form of optical modularization or other means, at least in terms of intensity of the auxiliary signal light, the intensity of the auxiliary idler light can be used in place of the intensity ratio between the auxiliary signal light and auxiliary idler light. In addition, if the system configuration necessitates measurement of the intensity of the auxiliary signal light, the first optical splitter 52 may be provided with an output port for the auxiliary signal light, of which the output intensity may be measured, thus establishing a more stable system configuration.

According to the quantum key delivery system 140 of the instant illustrative embodiment, the recipients A and B can share a common key required for the quantum key delivery system 140 by using signals received by the recipients A and B via the first and second receivers 92 and 94, respectively.

The operation of the quantum key delivery system 140 of the illustrative embodiment of the invention will be described in detail by referring again to FIGS. 4 and 5. Merely for illustration purpose, it is assumed that the excitation light, auxiliary signal light, auxiliary idler light, signal light, and idler light which enter and exit the nonlinear optical medium 40 are linearly polarized in the same direction of polarization. This state may be accomplished, in an application where, for example, a PPLN crystal is used as the second-order nonlinear optical medium 40, by using the $d_{33}$ component of the second-order nonlinear optical coefficient of the PPLN crystal and directing, for this purpose, excitation light polarized in the z-axis direction of the PPLN crystal.

The polarization separator/combiner 42 receives on the second and third input-output ports 42-2 and 42-3 respective rays of excitation light having wavelength $\lambda_p$ in the same magnitude and respectively p- and s-polarized. The PPLN crystal, the second-order nonlinear optical medium, is so placed that the direction of p-polarization is substantially coincident with the z-axis direction of the crystal. Since the PPLN crystal corresponds to the nonlinear optical medium 40, the medium 40 may also be referred to as the PPLN crystal.

If the excitation light is of 45-degree polarization, the polarization separator/combiner 42 develops excitation lights of p- and s-polarization respectively on the second and third input-output ports 42-2 and 42-3. The PPLN crystal is so placed that the direction of p-polarization agrees with the z-axis direction of the crystal.

First, a nonlinear optical process will be discussed which is caused by excitation light propagating over the optical loop path 46 in the clockwise direction in FIG. 4. This excitation light is the excitation light component outputted as p-polarized light from the second input-output port 42-2 of the polarization separator/combiner 42.

A normal, single-stage SPDC process will herein be considered as a process of generating pairs of correlated photons. At this time, the SPDC process causes a pair of correlated photons consisting of signal light and idler light to be produced. If the auxiliary signal light includes a p-polarized component, auxiliary idler light is produced by a DFG process.

The excitation light, signal light, idler light, auxiliary light and auxiliary idler light emerge from the PPLN crystal in the same state of polarization, and pass through the 90-degree polarization plane rotator 44. At this time, the lights have the plane of polarization thereof rotated through 90 degrees to become s-polarized waves. The waves are entered into the third input-output port 42-3 of the polarization separator/combiner 42. As a result, the light is outputted in the form of s-polarized waves from the first input-output port 42-1 of the separator/combiner 42.

More specifically, on one hand, the excitation light propagating in the optical loop path 46 in the clockwise direction causes the pairs of correlated photons, consisting of the s-polarized signal light and idler light, as well as the s-polarized auxiliary signal light and the auxiliary idler light to exit from the first input-output port 42-1 of the polarization separator/combiner 42.

On the other hand, discussion will be made on a nonlinear optical process caused by the excitation light propagating over the path 46 in the counterclockwise direction, i.e. the excitation light component outputted in the form of s-polarized light from the third input-output port 42-3 of the separator/combiner 42. The excitation light, when passing through the 90-degree polarization plane rotator 44, has its plane of polarization rotated through 90 degrees to become p-polarized. If the auxiliary signal light includes an s-polarized component, the plane of polarization also rotates through 90 degrees to become p-polarized. Then, when the excitation light enters the PPLN crystal, the plane of polarization of the excitation light and auxiliary signal light becomes substantially coincident with the z-axis direction of the crystal. Thus, incidence of the excitation light propagating over the optical loop path 46 in the counterclockwise direction produces pairs of correlated photons consisting of signal light and idler light in an SPDC process, in the same way as the excitation light propagating on the path 46 in the clockwise direction. In addition, auxiliary idler light is also produced by a DFG process.

If the light loss at the 90-degree polarization plane rotator 44 is neglected, the excitation light incident on the PPLN crystal is substantially equal in intensity to the excitation light when the excitation light propagating over the optical loop path 46 in the clockwise direction enters the crystal.

In this example, the clockwise excitation light entering the front end of the PPLN crystal is identical in direction of polarization and also in intensity with the counterclockwise excitation light entering the rear end of the crystal. Therefore, if the crystal is symmetrical about its central axis, not shown, then the probabilities in generating SHG light and pairs of SPDC correlated photons within the PPLN crystal are substantially identical between the clockwise and counterclockwise excitation light beams. That is also the case with the conversion efficiency of auxiliary idler light.

The excitation light, signal light, idler light, auxiliary signal light and auxiliary idler light developed from the PPLN crystal in response to the counterclockwise excitation light are entered as p-polarized waves into the second input-output port 42-2 of the polarization separator/combiner 42. The polarization separator/combiner 42 develops resultant p-polarized waves on its the first input-output port 42-1. More specifically, the excitation light propagating over the optical loop path 46 in the clockwise direction causes pairs of correlated photons, consisting of p-polarized signal light and idler light, and p-polarized auxiliary signal light and auxiliary idler light to emerge from the first input-output port 42-1 of the separator/combiner 42.

When the intensity of the excitation light is sufficiently low, the pairs of correlated photons consisting of signal light and idler light outputted from the first input-output port 42-1 of the polarization separator/combiner 42 is either one of the pairs of s-polarized correlated photons induced by the excitation light propagating on the optical loop path 46 in the clockwise direction and the pairs of p-polarized correlated photons induced by the excitation light propagating on the path 46 in the counterclockwise direction. Thus, the quantum state of the pairs of correlated photons produced by the quantum correlated-photon pair generator according to the illustrative embodiment of the invention is of a superimposition of correlated photon pair propagating on the path 46 in the clockwise direction and correlated photon pair propagating in the counterclockwise direction and orthogonal in polarization to the component propagating in the clockwise direction. That is, a pair of polarized-quantum entangled photons is produced.

The following description will be proceeded to in an application in which one signal light component, i.e. one component of the pair of polarized quantum entangled photons, is sent to the recipient A while the idler light component, i.e. the other component of the pair, is sent to the recipient B.

The intensity of the auxiliary signal light exiting from the optical loop path 46 is substantially constant regardless of the state of polarization of the auxiliary signal light entered into the path 46. Furthermore, the auxiliary idler light beams propagating over the path 46 in the clockwise and counterclockwise directions are substantially equal in conversion efficiency to each other, so that the auxiliary idler lights outputted from the path 46 remain constant regardless of the state of polarization of the auxiliary signal light when entering the loop path 46. In other words, the conversion efficiency of the output intensity of the auxiliary idler light outputted from the optical loop path 46 is substantially constant irrespective of the state of polarization of the auxiliary signal light. Therefore, it is not necessary to control the polarization of the auxiliary signal light.

Ideally, the excitation light components in the excitation light, auxiliary signal light, auxiliary idler light, signal light and idler light outputted from the first input-output port 42-1 of the polarization separator/combiner 42 are entirely outputted by the first optical coupler 50 from its transmission port. By contrast, the auxiliary signal light, auxiliary idler light, signal light and idler light are outputted from the reflection port, and then pass through the optical circulator 48 to its third input-output port 48-3. The residual component of the excitation light is filtered out by the optical low-pass filter 54.

The first optical splitter 52 directs and outputs at least the signal light wavelength component ($\lambda_s$) and idler light wavelength component ($\lambda_i$) of the rays of light having passed the optical low-pass filter 54 to the respective branching optical paths 150 and 154. Furthermore, the auxiliary idler light wavelength component ($\lambda_{i-2}$) is directed to the other optical path 142 for output.

In order to prevent undesired wavelength components from being mixed on those optical paths 150, 154 and 146, the first optical splitter 52 is required to have its wavelength-separating capability superior. As the first optical splitter 52 satisfying that requirement, for example, an AWG type WDM filter can be employed which is adapted to transmit at least the aforementioned four wavelength components. For example, such a filter may be combined with a fiber Bragg grating so as to sufficiently suppress the wavelength components of the excitation light.

From the auxiliary idler light component 146 having passed through the first optical splitter 52, first and second clock signals advantageously suitable for long-distance transmissions are extracted. In order to send the auxiliary idler light component to both recipients A and B, the second optical splitter 70 divides the auxiliary idler light component 146 into two components 148 and 152. One output 148 from the splitter 70 is combined with the signal light component 150 by the second optical coupler 72. The other output 152 from the splitter 70 is combined with the idler light component 154 by the third optical coupler 74.

The output 73 from the second optical coupler 72, i.e. the combined light of the signal light component and the auxiliary idler light component, and the output 75 from the third optical coupler 74, i.e. the combined light of idler light component and the auxiliary idler light component, will be transmitted to the recipients A and B, respectively, over the first and second quantum channels, respectively, formed by optical fiber or a free space.

The combined light 73 of the signal light component and the auxiliary idler light component propagated over the first quantum channel is again separated by the third optical splitter 76 into the signal light component 154 and the auxiliary idler light component 156. The auxiliary idler light component 156 is entered into the first signal processor 80, where the component 156 is converted into the corresponding, first electrical auxiliary idler signal 158. The temporal waveform of the first electrical auxiliary idler signal 158 from the first signal processor 80 is used to extract the clock signal 162 for use in the recipient A. The intensity of the idler signal 158 is used to monitor the expected value of the number of produced correlated photon pairs.

The signal light component 154 outputted from the third optical splitter 76 is converted by the first receiver 92 into a corresponding electrical signal, which will be received as an electrical reception signal by the recipient A. At this time, as described previously, a synchronous detection is carried out in time with the first clock signal 162 outputted from the first clock signal extractor 88.

Similarly, the idler light component and auxiliary idler light component having propagated over the second quantum channel 75 are again separated by the fourth optical splitter 78 into the idler light component 164 and the auxiliary idler light component 166. The auxiliary idler light component 166 is entered into the second signal processor 82 and converted into a corresponding second electrical auxiliary idler signal. The temporal waveform of the second electrical auxiliary idler signal 166 from the second signal processor 82 is used to extract the clock signal for use in the recipient B. The intensity of the idler signal 158 is used to monitor the expected value of the number of produced correlated photon pairs.

The idler light component 164 outputted from the fourth optical splitter 78 is converted by the second receiver 94 into a corresponding electrical signal, which will be received by the recipient B as an electrical idler signal. At this time, as described previously, a synchronous detection is carried out in time with the second clock signal 170 delivered from the second clock signal extractor 90.

In order to stabilize the expected value of the number of correlated photons to be produced, the intensity of the excitation light may be controlled sufficiently by means of either one of the first and second control signals 124 described earlier.

However, comparison of the first and second control signals 124 with each other makes it possible to estimate excess losses caused, for example, in the first and second quantum channels, respectively. Because, if an excess loss occurs in one quantum channel, the intensity of the auxiliary idler light transmitted over that quantum channel drops so that a difference in intensity is caused between the first and second control signals 124. When both first and second control signals 124 are utilized, a quantum key delivery system will be attained which also incorporates therein the function of detecting excess loss on the quantum channels with such circumstances taken into account.

In the illustrative embodiment described above, the process where pairs of correlated photons are produced involves only a normal, single-stage SPDC. It is however appreciated that the quantum correlated-photon pair generator can be implemented in other types of nonlinear optical process.

For example, a quantum correlated-photon pair generator can be accomplished by employing a cascaded SHG/SPDC process in a second-order nonlinear optical medium. In this case, the optical low-pass filter 54 may be used mainly to remove the SHG light. Further in that case, an additional optical bandpass filter may be used for cutting off the excitation light. In the latter case, since the wavelengths of the excitation light, signal light, idler light, auxiliary signal light and auxiliary idler light fall in the same wavelength range, it is important to adapt the first optical splitter 52 to sufficiently separate those wavelengths. In this case, the DFG process corresponds to a cascaded SHG/DFG process.

Similarly, an SFWM process in a third-order nonlinear optical medium may be utilized to implement a quantum key delivery system 140. In this case, since there does not exist light in the half-wavelength region, i.e. the excitation light in a simple SPDC process and SHG light produced in a cascaded SHG/SPDC process, the optical low-pass filter 54 may be dispensed with.

Similarly to the case in which a cascaded SHG/SPDC process is used, since the wavelengths of the excitation light, signal light, idler light, auxiliary signal light and auxiliary idler light fall in the same wavelength range, a sufficient wavelength separation effected by the first optical splitter, or WDM filter, 52 can accomplish the advantageous effects similar to those yielded by the aforementioned quantum key delivery system based only upon the normal, single-stage SPDC process. In this case, the auxiliary idler light is produced by an FWM process.

From depiction of FIGS. 4 and 5 showing the quantum key delivery system 140 according to the illustrative embodiment, the control mechanism is omitted, which corresponds to the system controller 138, FIG. 1, and is adapted for adjusting at least one of the values of the intensity and/or wavelength of the excitation light, and the temperature of the nonlinear optical medium by the first or second control signal 124. The control over the intensity and/or wavelength of the excitation light, and the temperature of the nonlinear optical medium may be implemented by applying an algorithm known per se utilizing control signals 124 produced from the first and second control signal generators 84 and 85.

Now, the configuration and operation of a quantum key delivery system 140 according to an alternative embodiment of the present invention will be described by referring to FIG. 6. Whereas the quantum key delivery system 140 according to the illustrative embodiment described with reference to FIG. 4 employs polarized quantum entangled photon pairs as described, the quantum key delivery system 140 according to the alternative embodiment is a telecommunications system utilizing time-positional quantum entangled photon pairs.

FIG. 6 depicts such a part of the quantum key delivery system 140 of the alternative embodiment which may be interconnected to the remaining portion of the system 140 shown in FIG. 5 and may have its fundamental structure different from what is shown in FIG. 4. Like components are, of course, designated with the same reference numerals, and will not repetitively be described merely for simplicity.

Details on the time-positional quantum entangled photon pairs are generally known from, for example, Kyo Inoue, "Quantum Engineering for Engineers", published by Morikita Publishing Co., Ltd., Tokyo, Japan, 1st ed., 1st issue, pp. 154-156, Feb. 6, 2008.

As shown in FIG. 6, excitation light 142 consisting of a couple of consecutive light pulses is generated from the excitation light source 62 and entered into the nonlinear optical medium 40. If the peak intensity of the pulsed excitation light 142 is appropriate, pairs of correlated photons produced by the nonlinear optical medium 40 through the SPDC, cascaded SHG/SPDC or SFWM. process take the quantum state such that the states caused by the first and second pulses of the excitation light 142 are superimposed upon each other, namely a pair of time-positional quantum entangled photons is raised. When the quantum key delivery system 140 is designed to operate on the SPDC or cascaded SHG/SPDC process, the nonlinear optical medium 40 may be a second-order nonlinear optical medium. When the system 140 is designed to operate on the SFWM process, the medium 40 may be a third-order nonlinear optical medium.

The expected values of the numbers of respective correlated photon pairs induced by the first and second pulses of the excitation light 142 are stabilized by the same method as in the illustrative embodiment shown in and described with reference to FIGS. 4 and 5. The auxiliary idler light 144 is used as a signal for extracting the first and second clock signals for long-distance communications.

The nonlinear optical medium 40 outputs the thus pulsed excitation light, signal light producing pairs of correlated photons, idler light, auxiliary signal light and auxiliary idler light on the line 178. The auxiliary signal light 144 may alternatively be continuous light. The auxiliary idler light is, however, pulsated because the excitation light 142 is pulsed light.

The output light 178 from the nonlinear optical medium 40 is connected to pass the optical low-pass filter 54, FIG. 5, and then divided by the first optical splitter 52 into a signal light wavelength component 150 ($\lambda_s$) and an idler light wavelength component 154 ($\lambda_i$) which form a pair of time-position quantum correlated photons. The two components 150 and 154 are directed and outputted to the respective branching optical paths. An auxiliary idler light wavelength component 146 ($\lambda_{i-2}$) for use in stabilization is directed and outputted to the further branching optical path.

The steps of directing the signal light wavelength component forming and outputting pairs of time-position quantum entangled photons, idler light wavelength component and auxiliary idler light component to the separate optical paths 150, 154 and 146, and combining them, of sending the components to the recipient A or B over the first or second quantum channel 154 or 164 and extracting clock signals for use in the recipients A and B, of producing the first or second control signal 124, and of receiving signals may be the same as the illustrative embodiment shown in and described with reference to FIGS. 4 and 5. Repetitive description thereon will be avoided for simplicity.

The quantum key delivery systems 140 according to the illustrative embodiments described above includes the second-order nonlinear optical effect of a PPLN crystal applied to the nonlinear optical medium 40. Optical media other than PPLN crystals can also be used if they exhibit the second-order nonlinear optical effect. Furthermore, when use is made of a medium exhibiting a third-order nonlinear optical effect such as optical fiber or thin silicon wire, designing details such as the wavelength transmission characteristics of the first and second optical couplers 50 and 52 may be modified so as to implement a quantum key delivery system producing the same advantageous effects as the illustrative embodiments shown in and described with reference to FIGS. 4, 5 and 6.

In the quantum key delivery systems 140 according to the illustrative embodiments shown in and described with reference to FIGS. 4, 5 and 6, the excitation light 142 and auxiliary signal light 144 can be entered by other methods known per se. For instance, the excitation light 142 and auxiliary signal light 144 can be combined by an optical coupler. In addition, the orientation of the optical axis of the nonlinear optical medium 40 and the direction of polarization of the excitation light entered into the medium 40 are design choices, which can be appropriately set according to which of the tensor components of the nonlinear optical coefficients are used.

To the 90-degree polarization plane rotator 44 to rotate the plane of polarization of the excitation light 142 and other light, a half-wavelength plate can be applied. However, where a simple SPDC process of a second-order nonlinear optical medium is employed, a half-wavelength plate cannot be used. Because, if the half-wavelength plate is designed for the excitation light, the plate would then operate as a quarter-wavelength plate for double-wavelength light (compared with the excitation light) such as the signal light and other light, thus failing to attain the function of rotating the plane of polarization through 90°. By contrast, if the half-wavelength plate is designed for the signal light and other longer-wavelength light, the plate would then operate as a 1/1 wavelength plate for the exciting plate, thus also failing to accomplish the function of rotating the plane of polarization through 90°. Accordingly, when a simple SPDC process of a second-order nonlinear optical medium is used, a 90-degree polarization plane rotator formed by a known method such as fiber fusion may be employed.

The entire disclosure of Japanese patent application No. 2010-191078 filed on Aug. 27, 2010, including the specification, claims, accompanying drawings and abstract of the disclosure, is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What I claim is:

1. A method for quantum key delivery, comprising the steps of:
    preparing a nonlinear optical medium responsive to excitation light entered to produce pairs of quantum correlated photons based on spontaneous parametric fluorescence, each pair including a signal photon and an idler photon, and responsive to auxiliary signal light entered to produce auxiliary idler light based on a stimulated parametric conversion process;
    entering the excitation light and the auxiliary signal light simultaneously into the nonlinear optical medium;
    separating output light from the nonlinear optical medium into a signal light component, an idler light component and an auxiliary idler light component to direct and output the components to respective branching optical paths;

when the signal light component and the auxiliary idler light component are entered, producing a first control signal for adjusting at least one of values of intensity and/or wavelength of the excitation light, and temperature of the nonlinear optical medium such that a ratio in intensity of the auxiliary idler light component to the auxiliary signal light component becomes substantially equal to a predetermined value, and producing a first electrical auxiliary idler signal converted from the auxiliary idler light component;

when the idler light component and the auxiliary idler light component are entered, producing a second control signal for adjusting at least one of the values of the intensity and/or wavelength of the excitation light, and the temperature of the nonlinear optical medium such that the ratio becomes substantially equal to the predetermined value, and producing a second electrical auxiliary idler signal converted from the auxiliary idler light component;

using at least one of the first and second control signals to adjust the at least one value to thereby maintain the ratio; and extracting clock signals from the first and second electrical auxiliary idler signals, and converting, in synchronism with the clock signals, the signal light component and the idler light component to a corresponding electrical reception signal and a corresponding electrical idler signal, respectively.

2. The method in accordance with claim 1, wherein the nonlinear optical medium is a second-order nonlinear optical medium operative on spontaneous parametric downconversion.

3. The method in accordance with claim 1, wherein the nonlinear optical medium is a third-order nonlinear optical medium operative on spontaneous four-wave mixing.

4. The method in accordance with claim 1, wherein the excitation light is continuous light.

5. The method in accordance with claim 1, wherein the excitation light is pulsated.

6. A system for quantum key delivery, comprising:
a nonlinear optical medium responsive to excitation light entered to produce pairs of quantum correlated photons based on spontaneous parametric fluorescence, each pair including a signal photon and an idler photon, and responsive to auxiliary signal light entered to produce auxiliary idler light based on a stimulated parametric conversion process;
an excitation light source for generating the excitation light;
an auxiliary signal light source for generating the auxiliary signal light;
a first optical coupler for combining the excitation light with the auxiliary signal light to output a resultant combined light;
an optical loop path including a polarization separator/combiner having first, second and third input-output ports, and a 90-degree polarization plane rotator, said optical loop path being formed by connecting the second and third input-output ports via said nonlinear optical medium and said 90-degree polarization plane rotator;
a first optical splitter for separating output light outputted from said nonlinear optical medium into a signal light component, an auxiliary signal light component, an idler light component and an auxiliary idler light component to output the components;
a second optical splitter for dividing the auxiliary idler light component into two components;
a second optical coupler for combining one of the two components with the signal light component;
a third optical coupler for combining another of the two components with the idler light component;
a third optical splitter for receiving a first quantum channel transfer signal including the auxiliary idler light component and the signal light component exiting from said second optical coupler and propagated over a first quantum channel, and separating again the received first quantum channel transfer signal into the signal light component and the auxiliary idler light component to output the light components;
a fourth optical splitter for receiving a second quantum channel transfer signal including of the auxiliary idler light component and the idler light component exiting from said third optical coupler and propagated over a second quantum channel, and separating again the received second quantum channel transfer signal into the idler light component and the auxiliary idler light component to output the light components;
a first signal processor operative in response to the auxiliary idler light component received from said third optical splitter for producing a first control signal for adjusting at least one of values of intensity and/or wavelength of the excitation light, and temperature of said nonlinear optical medium such that a ratio in intensity of the auxiliary idler light component to the auxiliary signal light component becomes substantially equal to a predetermined value, and for producing a first electrical auxiliary idler signal converted from the auxiliary idler light component;
a second signal processor operative in response to the auxiliary idler light component received from said fourth optical splitter for producing a second control signal for adjusting at least one of the values of the intensity and/or wavelength of the excitation light, and the temperature of the nonlinear optical medium such that the ratio becomes substantially equal to the predetermined value, and for producing a second electrical auxiliary idler signal converted from the auxiliary idler light component;
a first clock signal extractor for receiving the first electrical auxiliary idler signal to output a first clock signal;
a second clock signal extractor for receiving the second electrical auxiliary idler signal to output a second clock signal;
a first receiver operative in time with the first clock signal for converting the signal light component to a corresponding electrical reception signal; and
a second receiver operative in time with the second clock signal for converting the idler light component to a corresponding electrical idler signal.

7. The system in accordance with claim 6, further comprising a controller operative in response to at least one of the first and second control signals to control at least one of the intensity and/or wavelength of the excitation light, and the temperature of said nonlinear optical medium.

8. The system in accordance with claim 6, wherein the nonlinear optical medium is a second-order nonlinear optical medium operative on spontaneous parametric downconversion.

9. The system in accordance with claim 6, wherein the nonlinear optical medium is a third-order nonlinear optical medium operative on spontaneous four-wave mixing.

10. The system in accordance with claim 6, wherein the excitation light is continuous light.

11. The system in accordance with claim 10, wherein the excitation light is polarized by 45 degree.

12. The system in accordance with claim 6, wherein the excitation light is pulsated.

13. The system in accordance with claim 12, wherein the excitation light is polarized by 45 degree.

14. A system for quantum key delivery, comprising:
a nonlinear optical medium responsive to excitation light entered to produce pairs of quantum correlated photons based on spontaneous parametric fluorescence, each pair including a signal photon and an idler photon, and responsive to auxiliary signal light entered to produce auxiliary idler light based on a stimulated parametric conversion process;
an excitation light source for generating the excitation light;
an auxiliary signal light source for generating the auxiliary signal light;
a first optical coupler for combining the excitation light with the auxiliary signal light to output a resultant combined light;
a first optical splitter for separating output light outputted from said nonlinear optical medium into a signal light component, an auxiliary signal light component, an idler light component and an auxiliary idler light component to output the components;
a second optical splitter for dividing the auxiliary idler light component into two components;
a second optical coupler for combining one of the two components with the signal light component;
a third optical coupler for combining another of the two components with the idler light component;
a third optical splitter for receiving a first quantum channel transfer signal including the auxiliary idler light component and the signal light component exiting from said second optical coupler and propagated over a first quantum channel after, and separating again the received first quantum channel transfer signal into the signal light component and the auxiliary idler light component to output the light components;
a fourth optical splitter for receiving a second quantum channel transfer signal including the auxiliary idler light component and the idler light component exiting from said third optical coupler and propagated over a second quantum channel, separating again the received second quantum channel transfer signal into the idler light component and the auxiliary light component to output the light components;
a first signal processor operative in response to the auxiliary idler light component received from said third optical splitter for producing a first control signal for adjusting at least one of values of intensity and/or wavelength of the excitation light, and temperature of the nonlinear optical medium such that a ratio in intensity of the auxiliary idler light component to the auxiliary signal light component becomes substantially equal to a predetermined value, and for producing a first electrical auxiliary idler signal converted from the auxiliary idler light component;
a second signal processor operative in response to the auxiliary idler light component received from said fourth optical splitter for producing a second control signal for adjusting at least one of the values of the intensity and/or wavelength of the excitation light, and the temperature of the nonlinear optical medium such that the ratio becomes substantially equal to the predetermined value, and for producing a second electrical auxiliary idler signal converted from the auxiliary idler light component;
a first clock signal extractor for receiving the first electrical auxiliary idler signal to output a first clock signal;
a second clock signal extractor for receiving the second electrical auxiliary idler signal to output a second clock signal;
a first receiver operative in time with the first clock signal for converting the signal light component to a corresponding electrical reception signal; and
a second receiver operative in time with the second clock signal for converting the idler light component to a corresponding electrical idler signal.

15. The system in accordance with claim 14, wherein the excitation light is pulsated.

16. The system in accordance with claim 15, wherein the excitation light includes a couple of consecutive optical pulses.

17. The system in accordance with claim 14, further comprising a controller operative in response to at least one of the first and second control signals to control at least one of the intensity and/or wavelength of the excitation light, and the temperature of said nonlinear optical medium.

18. The system in accordance with claim 14, wherein the nonlinear optical medium is a second-order nonlinear optical medium operative on spontaneous parametric downconversion.

19. The system in accordance with claim 14, wherein the nonlinear optical medium is a third-order nonlinear optical medium operative on spontaneous four-wave mixing.

20. The system in accordance with claim 14, wherein the excitation light is continuous light.

* * * * *